(12) United States Patent
Dunk

(10) Patent No.: US 6,793,287 B2
(45) Date of Patent: Sep. 21, 2004

(54) BOOSTER SEAT HEAD REST

(76) Inventor: Susan C. Dunk, 115 Copper Ct., Potomac Falls, VA (US) 20165

(*) Notice: Subject to any disclaimer, the term of this patent is extended or adjusted under 35 U.S.C. 154(b) by 0 days.

(21) Appl. No.: 10/295,838

(22) Filed: Nov. 18, 2002

(65) Prior Publication Data
US 2004/0095003 A1 May 20, 2004

(51) Int. Cl.⁷ .............................................. A47D 15/00
(52) U.S. Cl. .................. 297/397; 297/219.12; 297/464; 297/230.13; 5/655
(58) Field of Search .............................. 297/397, 464, 297/465, 250.1, 219.12, 230.1, 230.13, 284.5; 5/652, 655, 657, 640; 441/125, 126, 127, 130

(56) References Cited

U.S. PATENT DOCUMENTS

| | | | | |
|---|---|---|---|---|
| 691,341 A | * | 1/1902 | Gore ............................ 441/123 |
| 2,582,571 A | * | 1/1952 | Chernivsky .................. 297/397 |
| 2,848,040 A | * | 8/1958 | Thoma ........................ 297/296 |
| 4,738,488 A | * | 4/1988 | Camelio ...................... 297/383 |
| 4,776,049 A | * | 10/1988 | Perron ............................ 5/640 |
| 4,862,536 A | * | 9/1989 | Pruit ........................ 297/284.5 |
| 4,951,998 A | * | 8/1990 | McClain ..................... 297/395 |
| 5,054,854 A | * | 10/1991 | Pruit ........................ 297/284.3 |
| 5,137,335 A | * | 8/1992 | Marten ........................ 297/485 |
| 5,248,182 A | * | 9/1993 | Hittie ........................ 297/230.1 |
| 5,332,292 A | | 7/1994 | Price et al. |
| 5,345,633 A | * | 9/1994 | Harnish .......................... 5/639 |
| 5,383,711 A | | 1/1995 | Houghteling |
| 5,486,037 A | | 1/1996 | Harper |
| 5,501,508 A | * | 3/1996 | Llewellyn .................... 297/397 |
| 5,544,378 A | * | 8/1996 | Chow ............................ 5/644 |
| 5,567,015 A | * | 10/1996 | Arias .......................... 297/397 |
| 5,735,576 A | | 4/1998 | Pepys et al. |
| 5,785,388 A | * | 7/1998 | Curtis ........................ 297/482 |
| 5,979,981 A | | 11/1999 | Dunne et al. |
| 6,017,094 A | * | 1/2000 | Syiek ......................... 297/482 |
| 6,038,720 A | * | 3/2000 | Matthews et al. .............. 5/639 |
| 6,086,152 A | * | 7/2000 | Zeller ...................... 297/284.5 |
| 6,139,100 A | | 10/2000 | Baskin-Lockman et al. |
| 6,266,832 B1 | * | 7/2001 | Ezell ............................ 5/640 |
| 6,386,639 B1 | | 5/2002 | McMichael |
| 6,435,617 B1 | * | 8/2002 | McNair ...................... 297/397 |
| 6,523,901 B2 | * | 2/2003 | Smith ......................... 297/392 |
| 6,554,363 B1 | * | 4/2003 | Silva .......................... 297/397 |
| D481,247 S | * | 10/2003 | Roberts et al. ............. D6/604 |
| 2001/0054837 A1 | * | 12/2001 | O'Connor .................. 297/397 |

* cited by examiner

Primary Examiner—Peter M. Cuomo
Assistant Examiner—Stephen D'Adamo
(74) Attorney, Agent, or Firm—Richard C. Litman

(57) ABSTRACT

A booster seat head rest comprises a harness assembly and at least one pillow attached to and suspended from the harness assembly.

9 Claims, 6 Drawing Sheets

BOOSTER SEAT HEAD REST

BACKGROUND OF THE INVENTION

1. Field of the Invention

The present invention relates generally to head rests for children, and more particularly to supplemental head rests for child booster and safety seats used in automobiles.

2. Description of the Related Art

Pillows and padding to position and restrain small children within automobile safety seats are well known. Personalized support and cushioning devices were implemented long before the use of child safety seats was mandated. However, most of these early efforts were not durable or easy to use, posed hazardous to the child, and amounted to a partial solution to the problem.

U.S. Pat. No. 5,332,292, issued to Pamela Price et al. in July 1994, discloses a portable protective cushion arrangement for a toddler's car seat. However, the device does not attach to, and is not suspended from, the vehicle's head rest.

U.S. Pat. No. 5,383,711, issued to Barbara Houghteling in January 1995, teaches a head support for infant's and toddler's car seats. However, the device does not attach to, and is not suspended from, the vehicle's head rest.

U.S. Pat. No. 5,486,037, issued to Marge Harper in January 1996, discloses an infant headrest for child safety seat. However, the device does not attach to, and is not suspended from, the vehicle's head rest.

U.S. Pat. No. 5,735,576, issued to Shirley Pepys et al. in April 1998, teaches a head support for infants and toddlers. However, the device does not attach to, and is not suspended from, the vehicle's head rest.

U.S. Pat. No. 5,979,981, issued to Debra Dunne et al. in November 1999, discloses a dual mode infant head rest. However, the device does not attach to, and is not suspended from, the vehicle's head rest.

U.S. Pat. No. 6,139,100, issued to Sharon Baskin-Lockman et al. in October 2000, teaches a child's car seat with multi-positionable headrest. However, the device does not attach to, and is not suspended from, the vehicle's head rest.

U.S. Pat. No. 6,386,639 B1, issued to Mary C. McMichael in May 2002, discloses a baby support for an infant seat or toddler seat. However, the device does not attach to, and is not suspended from, the vehicle's head rest, and requires a head covering device.

None of the above inventions and patents, taken either singularly or in combination, is seen to describe the instant invention as claimed. Thus a booster seat head rest solving the aforementioned problems is desired.

SUMMARY OF THE INVENTION

The present invention is a head rest, more specifically a supplemental head and body rest for use in automotive safety and booster seats for children. The head rest comprises a harness assembly and at least one pillow. The booster seat head rest is attached to and suspended from the head rest of the vehicle seat by a harness assembly. A plurality of pillows are further suspended from the harness assembly to provide lateral restraints for a child seated in an automotive safety or booster seat.

Accordingly, it is a principal object of the invention to provide head and neck support for a child in a safety seat.

It is another object of the invention to provide lateral support for a child in a safety seat.

It is a further object of the invention to disclose an auxiliary support for a child seat, wherein the support attaches to the headrest of the automobile's seat back.

Still another object of the invention is to disclose an auxiliary support for a child safety seat, wherein the retention straps are inaccessible to a child in the safety seat.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
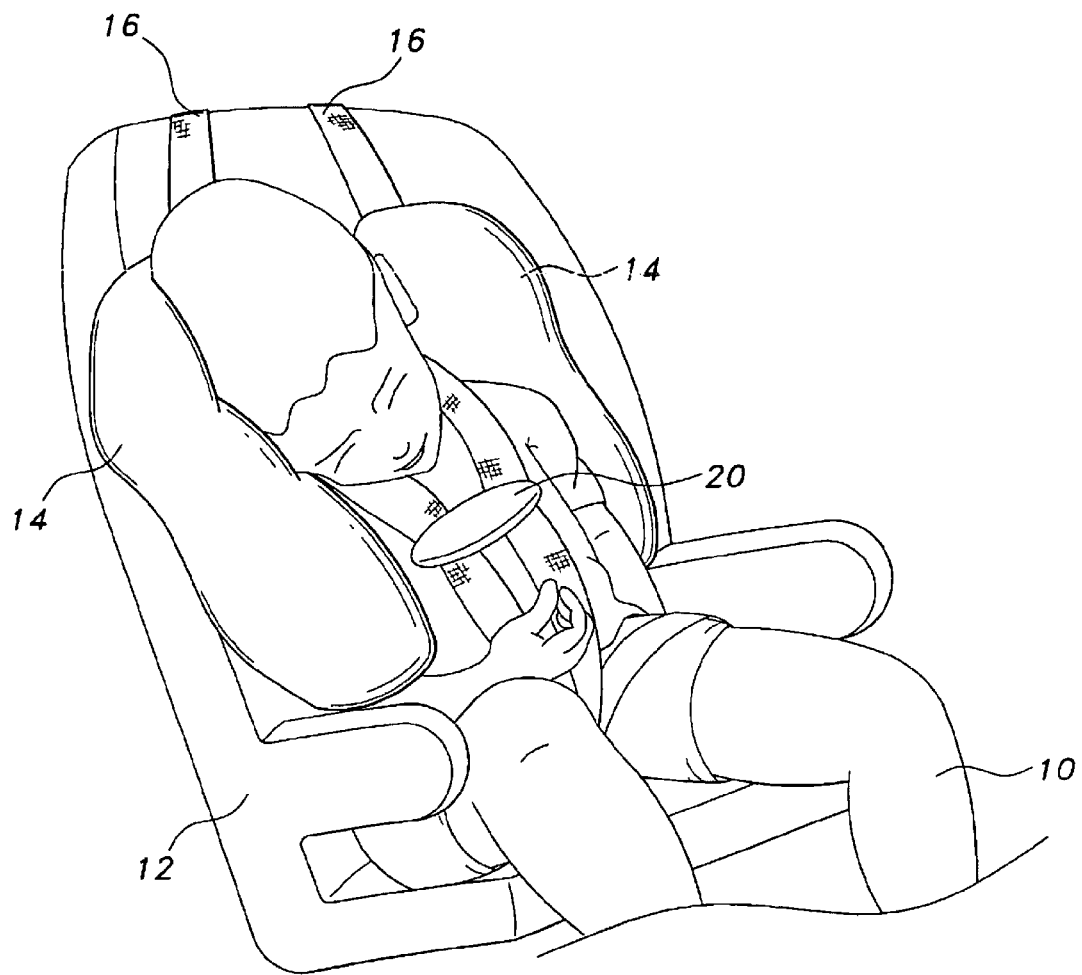
FIG. 1 is an environmental, perspective view of a booster seat head rest according to the present invention.
Figure 2:
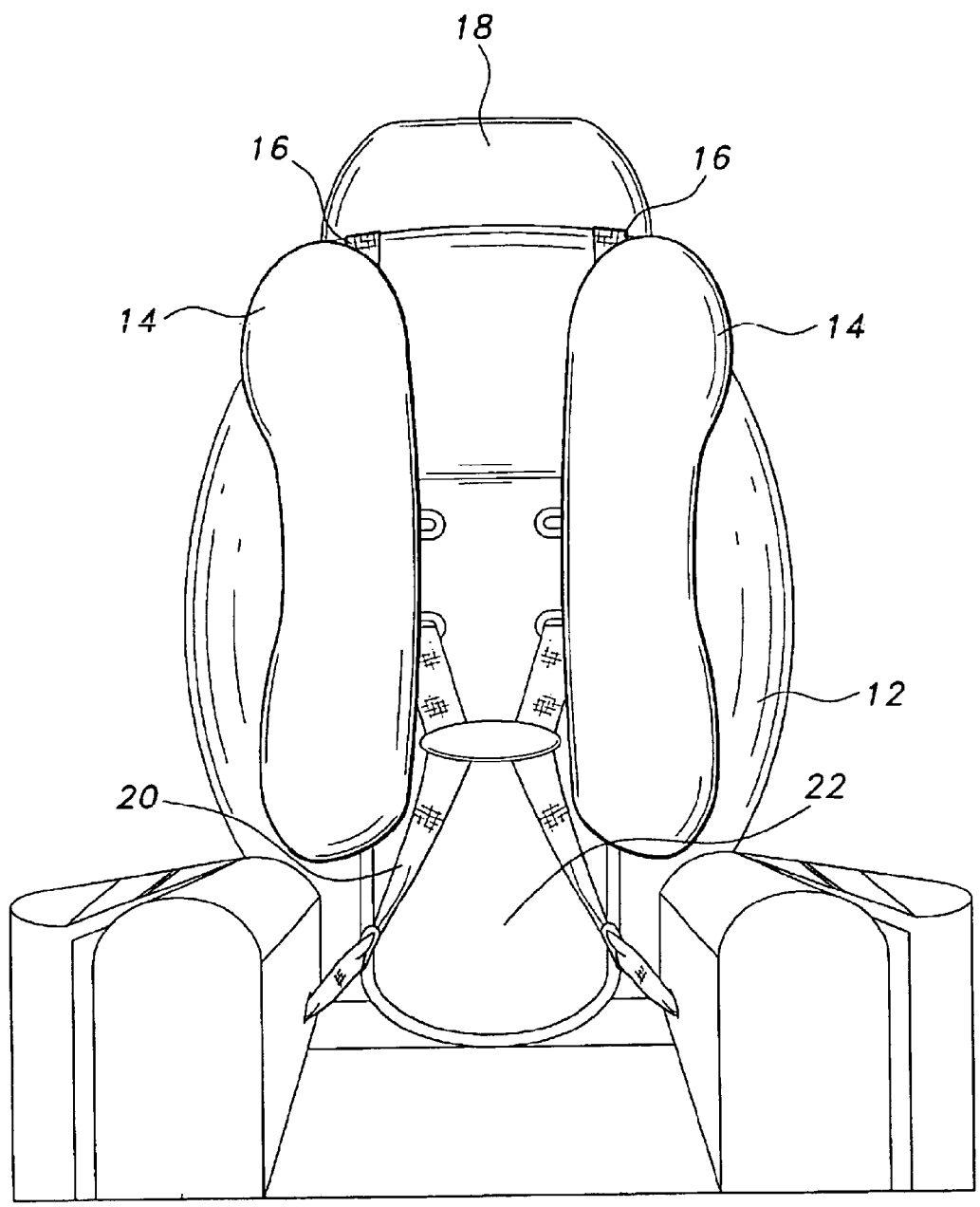
FIG. 2 is a perspective view of a head rest in an automobile safety seat.

FIGS. 1 and 2 are environmental and perspective views, respectively, of a booster seat head rest according to the present invention. A child 10 is shown sleeping in a booster seat 12. The child's 10 head is lolled to the side during sleep due to the upright posture imposed by the booster seat 12. It is necessary for automobile passengers to sit with an upright posture to permit the automobile's seat belts to work properly in case of an accident. An upright posture may reduce the likelihood of injury. Thus, a reclined seat back or reclined seating position may compromise safety by permitting the child or other passenger to slide beneath the seatbelt in case of an accident. However, as much as a parent wants to keep their child safe in an automobile, the silence of the child's sleep is golden. An upright posture is simply not conducive to a child's sleeping comfort.

As the seated child falls asleep, an upright posture forces the child's head to loll to the side. Upon waking, the child is likely to experience discomfort due to the contorted sleeping position. Most automobile seat backs have a small degree of rearward cant built into them for some passenger comfort. As a result of this cant, the child's head will loll to the side most of the time. The typical booster seat 12 or other child safety seat does not have lateral supports sufficient to support the head of a sleeping child. Discomfort is likely upon waking.

The booster seat head rest includes a plurality of pillows 14 to comfortably support the child 10 during sleep. The pillows 14 are oriented within the booster seat 12 and beside the child's head and upper body to hold the child's neck straighter and his or her head more upright, reducing fatigue and discomfort. The pillows 14 hang from suspension straps 16 which are part of a harness assembly. The harness assembly is secured around an automobile seat head rest 18.

The typical booster seat 12 comprises a booster seat cushion 22 along the bottom and back for comfort, and further comprises a booster seat seatbelt 20 threaded through the booster seat 12 and the booster seat cushion 22 to secure the child 10 to the booster seat 12.

Figure 3:
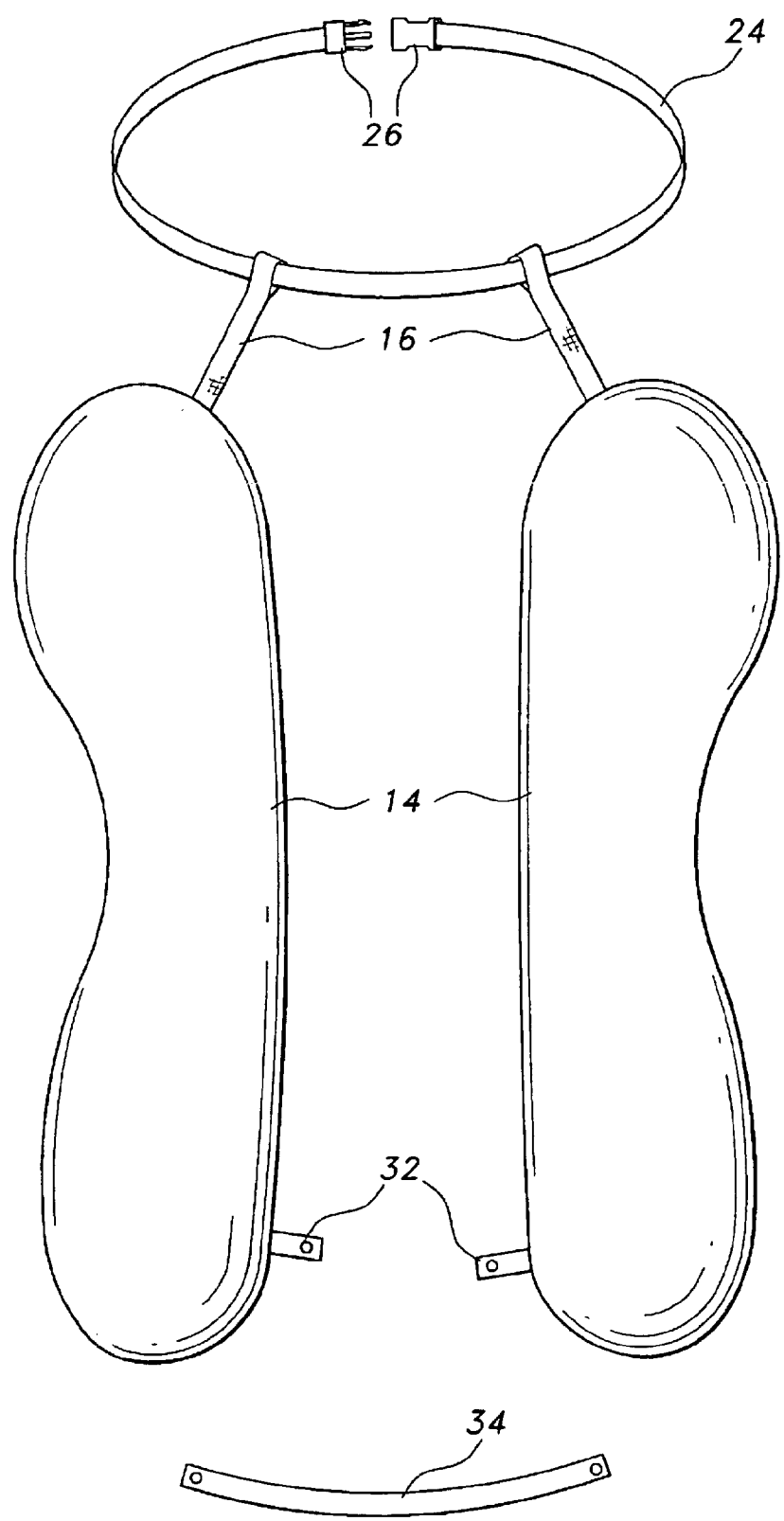
FIG. 3 is a perspective view of the head rest assembly.
Figure 4A:
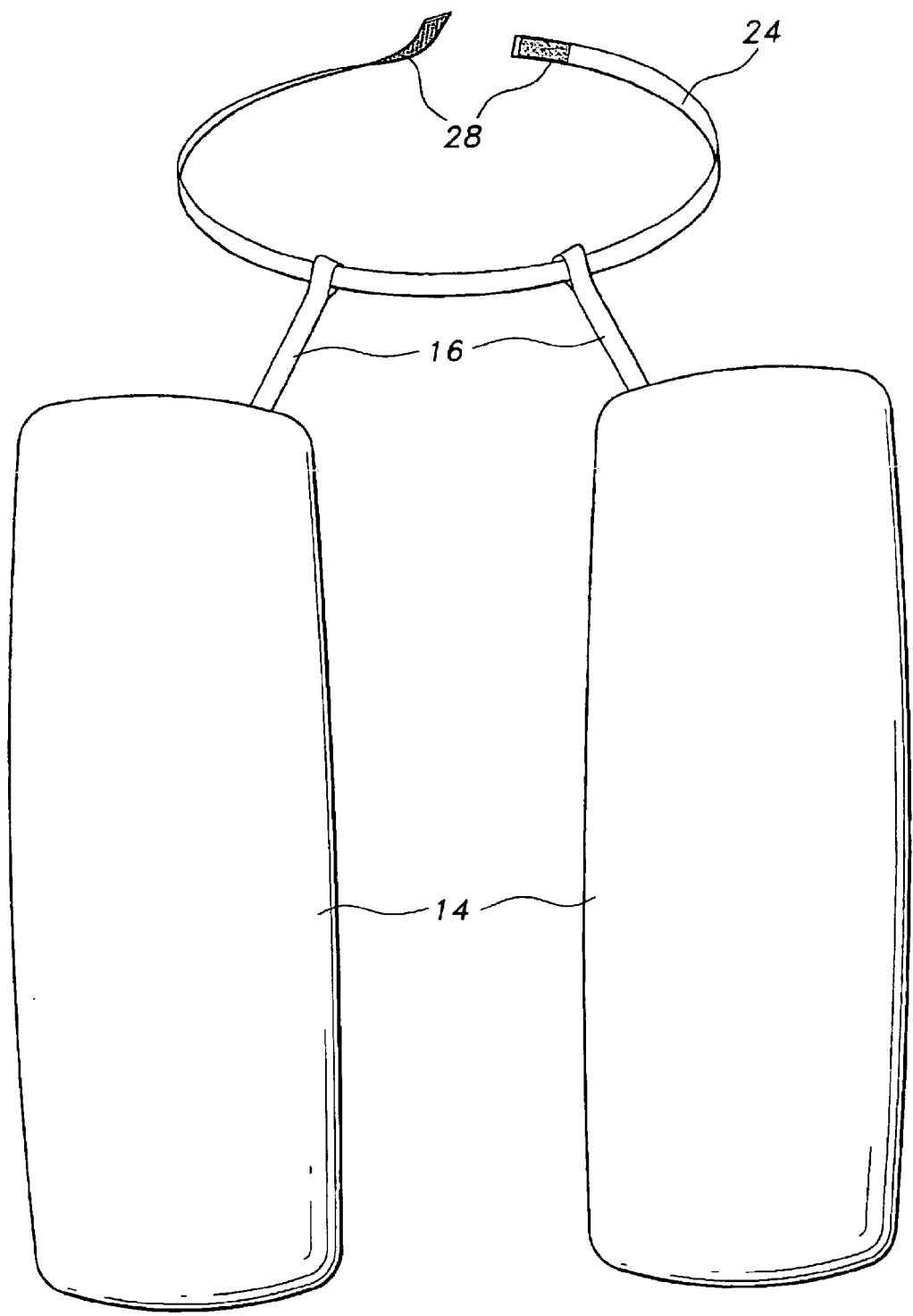
FIGS. 4a and 4b are front and top perspective views of an alternative embodiment of the head rest assembly.
Figure 4B:
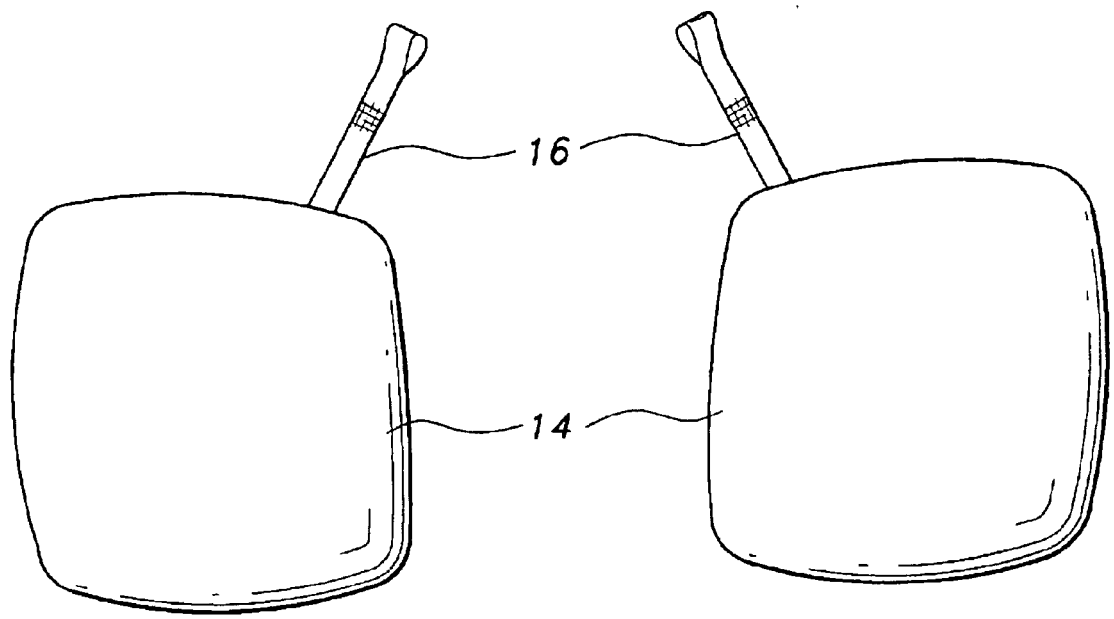

FIGS. 3, 4a, and 4b are perspective views of the head rest assembly. The plurality of pillows 14 are shown attached to and suspended from suspension straps 16. The suspension straps 16 are attached to and suspended from the suspension belt 24 which is attached around an automobile seat head rest 18. Typically, the suspension straps 16 are routed from the suspension belt 24 to the pillows 14 over the top of the booster seat 12. The suspension straps 16 include a loop at one end to attach to the suspension belt 24. This permits the suspension straps 16 and the pillows 14 to slide along the suspension belt 24 until the proper spacing or width is achieved. By attaching the suspension belt 24 to the automobile seat head rest 18 and routing the suspension straps 16 over the top of the booster seat 12, a child 10 in the booster seat 12 is effectively prevented from tampering with or becoming entangled in the suspension straps 16 or the suspension belt 24. In another embodiment, only one pillow 14 is attached to the harness assembly.

The suspension belt 24 is secured by means of a buckle 26 or by hook and loop fabric 28 or other means. The suspension belt 24 is fully adjustable to fit securely around any automobile seat head rest 18.

The pillows 14 are available in a variety of shapes and sizes, including an elongated kidney shape, rectangular and square. These and other shapes permit the user to customize the booster seat head rest to fit the size of the child 10 strapped into the seat, and further permit the user to select support to suit his current needs. The adjustable and selective support feature permits the user to provide additional support for head only, the torso only, the head and torso, one side only, or other variations.

In another embodiment, the pillows are joined together by a laterally oriented tether strap 34. The tether strap 34 is removable and is secured to the pillows 14 by a pair of tether tabs 32 attached to the pillows 14. In one embodiment, the tether tabs 32 are secured to the tether strap 34 by snaps. Other variations may use buckles or hook and loop material. The tether strap 34 attaches the pillows 14 together to prevent them from spreading apart and compromising their lateral support. In one embodiment, the tether strap 34 is routed behind or beneath the booster seat cushion 22. Routing the tether strap 34 behind the booster seat cushion 22 reduces the likelihood of injury due to entanglement in the tether strap 34 and virtually eliminates the ability of the child to tamper with the tether strap 34.

Figure 5:
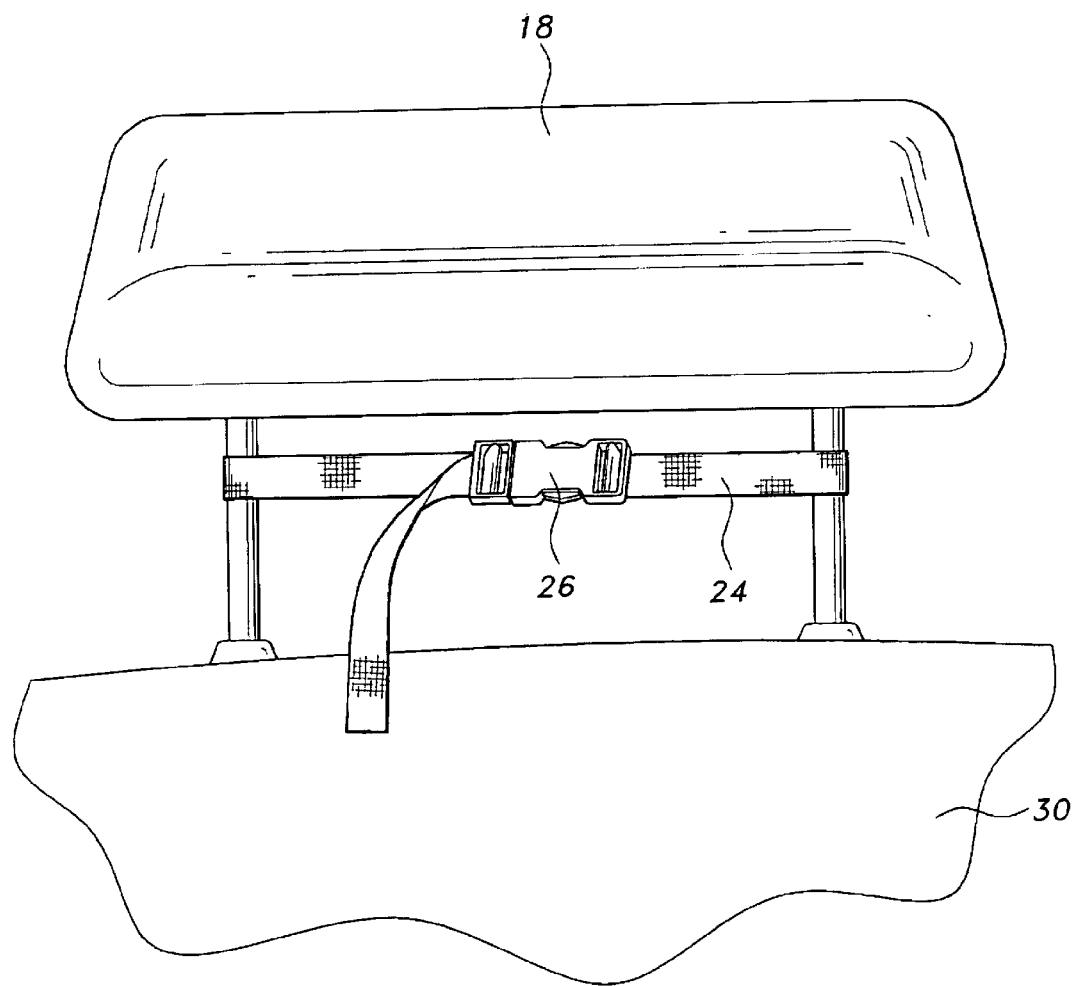
FIG. 5 is a rear view of the head rest secured to automobile seat head rest.

FIG. 5 is a rear view of the head rest secured to automobile seat head rest 18. The suspension belt 24 is secured around an automobile seat head rest 18 and not to the booster seat 12 itself. An adjustable closure in the suspension belt 24 permits the suspension belt 24 to fit around any automobile seat head rest 18. Here, the adjustable closure is a buckle 26, though it may also be hook and loop fabric 28 or similar means. This adjustability permits the booster seat head rest to be used on any of the many varieties of automobile seat head rests available on the market today, including those with exposed supports (shown) which project from the top of an automobile seat 30, and those with fabric-covered supports (not shown).

It is to be understood that the present invention is not limited to the embodiments described above, but encompasses any and all embodiments within the scope of the following claims.

I claim:

1. A auxiliary support for a child safety seat comprising:
    a harness assembly comprising an adjustable belt and a plurality of suspension straps, wherein the harness assembly is secured around an automobile seat head rest by the adjustable belt;
    a plurality of pillows attached to the harness assembly by the plurality of suspension straps, wherein the suspension straps are slidably attached to the adjustable belt; and
    a tether strap linking the plurality of pillows, wherein the tether strap is concealed behind a booster seat cushion.

2. The auxiliary support according to claim 1, wherein the suspension straps are constructed and configured so as to be slidably adjustable along the suspension belt.

3. An auxiliary support according to claim 1, wherein said suspension belt includes a pair of opposing ends and a fastener having a pair of mating ends attached at said opposing ends of the suspension belt.

4. The auxiliary support according to claim 3, wherein the mating ends of said fastener include hook and loop fabric.

5. The auxiliary support according to claim 3, wherein the mating ends of said fastener include a buckle.

6. A cushion system comprising:
    a plurality of pillows;
    a tether strap, the plurality of pillows linked by said tether strap; and
    a harness assembly, said harness assembly including a suspension belt, a fastener having a pair of mating ends, and a plurality of suspension straps, each said suspension strap having two ends;
    wherein one end of each suspension strap is slidably attached to the suspension belt, and the opposite end of each suspension strap is attached to a respective one of said pillows, and said pair of mating ends are attached at opposite ends of the suspension belt;
    whereby said pillows are attached to and suspended from the harness assembly.

7. A cushion system of claim 6, wherein the mating ends of said fastener is hook and loop fabric.

8. A cushion system of claim 6, wherein the mating ends of said fastener includes an adjustable buckle.

9. A cushion system of claim 6, wherein the tether strap is arranged and configured to be located at the rear of said pillows.

* * * * *